US010979231B2

(12) United States Patent
Wei et al.

(10) Patent No.: US 10,979,231 B2
(45) Date of Patent: Apr. 13, 2021

(54) CROSS-CHAIN AUTHENTICATION METHOD, SYSTEM, SERVER, AND COMPUTER-READABLE STORAGE MEDIUM

(71) Applicant: Advanced New Technologies Co., Ltd., Grand Cayman (KY)

(72) Inventors: Yawen Wei, Hangzhou (CN); Jianjun Zhang, Hangzhou (CN); Zhiwei Wang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/086,075

(22) Filed: Oct. 30, 2020

(65) Prior Publication Data
US 2021/0051023 A1 Feb. 18, 2021

Related U.S. Application Data

(63) Continuation of application No. PCT/CN2019/096513, filed on Jul. 18, 2019.

(51) Int. Cl.
*H04L 9/32* (2006.01)
*H04L 9/08* (2006.01)

(52) U.S. Cl.
CPC .......... *H04L 9/3247* (2013.01); *H04L 9/0825* (2013.01); *H04L 9/3231* (2013.01); *H04L 9/3236* (2013.01); *H04L 2209/38* (2013.01)

(58) Field of Classification Search
CPC ... H04L 9/3247; H04L 9/3236; H04L 9/0825; H04L 9/3231; H04L 2209/38
See application file for complete search history.

(56) References Cited

U.S. PATENT DOCUMENTS 10,554,413 B2 * 2/2020 Qiu ..................... H04L 9/3247
2016/0381001 A1 12/2016 Li
(Continued)

FOREIGN PATENT DOCUMENTS

CN 105719185 6/2016
CN 106447309 2/2017
(Continued)

OTHER PUBLICATIONS

Zheng et al, "An organization-friendly blockchain system", Aug. 21, 2019, Computers and Security, pp. 1-14.*
(Continued)

*Primary Examiner* — Christopher A Revak
(74) *Attorney, Agent, or Firm* — Fish & Richardson P.C.

(57) ABSTRACT

Disclosed herein are methods, systems, and apparatus for cross-chain authentication. One of the methods includes: obtaining an identity confirmation request and a first public key; obtaining an identity verification request and a corresponding identity verification identifier for identity verification of a user associated with the user terminal; sending the identity verification request and the first public key to the user terminal; obtaining digitally signed data, a second public key, and identity verification data; verifying an identity of the user based on the identity verification data; verifying that the first public key and the second public key correspond to the user; and recording authentication data comprising the digitally signed data and the identity verification identifier to a blockchain.

21 Claims, 6 Drawing Sheets

(56) References Cited

U.S. PATENT DOCUMENTS

| | | | | |
|---|---|---|---|---|
| 2019/0340266 | A1* | 11/2019 | Vo | G06F 16/27 |
| 2020/0026834 | A1* | 1/2020 | Vimadalal | G06F 16/182 |
| 2020/0051074 | A1* | 2/2020 | Suh | G06Q 20/4018 |
| 2020/0177388 | A1* | 6/2020 | Qiu | H04L 9/3236 |
| 2020/0278958 | A1* | 9/2020 | Zhang | G06F 16/27 |
| 2020/0313901 | A1* | 10/2020 | Lin | H04L 9/3247 |

FOREIGN PATENT DOCUMENTS

| | | |
|---|---|---|
| CN | 106534160 | 3/2017 |
| CN | 106899698 | 6/2017 |
| CN | 106960388 | 7/2017 |
| CN | 107079036 | 8/2017 |
| CN | 107239940 | 10/2017 |
| CN | 107742210 | 2/2018 |
| CN | 108064440 | 5/2018 |
| CN | 108415784 | 8/2018 |
| CN | 109257342 | 1/2019 |
| KR | 20180054530 | 5/2018 |
| TW | 201812630 | 4/2018 |

OTHER PUBLICATIONS

Jiang et al, "A Cross-Chain Solution to Integrating Multiple Blockchains for IoT Data Management", May 1, 2019, Sensors 2019, pp. 1-18.*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2019/096513, dated Sep. 26, 2019, 12 pages (with partial English translation).

* cited by examiner

US 10,979,231 B2

CROSS-CHAIN AUTHENTICATION METHOD, SYSTEM, SERVER, AND COMPUTER-READABLE STORAGE MEDIUM

CROSS-REFERENCE TO RELATED APPLICATIONS

This application is a continuation of PCT Application No. PCT/CN2019/096513, filed on Jul. 18, 2019, which claims priority to Chinese Patent Application No. 201811028251.5, filed on Sep. 4, 2018, and each application is hereby incorporated by reference in its entirety.

TECHNICAL FIELD

Embodiments of the present specification relate to the field of data processing technologies, and in particular, to cross-chain authentication methods, systems, servers, and computer-readable storage media.

BACKGROUND

Existing blockchain technologies generally have the following four characteristics: 1. de-centralization; 2. more stable, reliable, and sustainable in terms of overall technical configuration because of the fact that a blockchain has a distributed network architecture with no central node prone to impact or attacks; 3. high security, where a consensus mechanism does not need intervention of third parties; and (4) transparent and tamper-resistant transactions. The blockchain technologies become increasingly valued because of these characteristics.

When used, the existing blockchain technologies usually identify so-called identities based on identity public keys. In one method, a user writes data to different blockchains by using the same identity private key for signing. Whether operators of records of different blockchains are the same is determined by determining whether identity public keys are consistent. However, such determining cannot be performed across blockchains.

SUMMARY

Embodiments of the present specification provide cross-chain authentication methods, systems, servers, and computer-readable storage media, so that identity confirmation can be performed across blockchains, thereby implementing cross-chain identity confirmation.

According to a first aspect of some embodiments of the present specification, a cross-chain authentication method is provided and applied to an authentication server, including: obtaining an identity confirmation request and a first identity public key, where the identity confirmation request is generated by a second service server based on a received cross-chain query request, the cross-chain query request is generated based on a cross-chain query operation that is sent by a user terminal and that is received by a first service server, and the first identity public key is stored in the first service server; in response to the identity confirmation request, obtaining a target identity verification request and its corresponding target identity verification identifier that are used for identity verification, and sending the target identity verification request and the first identity public key to the user terminal; obtaining target private key signature data, a second identity public key, and target identity verification data, where the target identity verification data is collected by the user terminal based on the target identity verification request, the second identity public key is generated by the user terminal by using a key generator, and the target private key signature data is obtained by the user terminal by signing second signature data by using the second identity private key; performing identity verification by using the target identity verification data, and verifying whether the first identity public key and the second identity public key correspond to a same user; and when the identity verification succeeds and it is verified that the two identity public keys correspond to a same user, storing obtained target authentication data to an authentication blockchain, where the target authentication data includes the target private key signature data and the target identity verification identifier; and obtaining corresponding target public key request data based on the target identity verification request and sending the target public key request data to the second service server, where the target public key request data includes the second identity public key.

According to a second aspect of some embodiments of the present specification, a cross-chain authentication method is provided and applied to a user terminal, including: in a process of performing a service operation on a first blockchain stored in a first service server, obtaining a cross-chain query operation specific to a second blockchain in a second service server, and sending the cross-chain query operation to the first service server; obtaining a target identity verification request and a first identity public key, where the target identity verification request is generated by an authentication server based on an identity confirmation request corresponding to the cross-chain query operation, and the first identity public key is stored in the first service server; and collecting corresponding target identity verification data in response to the target identity verification request, generating a target key pair including a second identity public key and a second identity private key by using a key generator, and signing second signature data by using the second identity private key to obtain target private key signature data; verifying whether the first identity public key is valid; and when it is verified that the first identity public key is valid, sending the target private key signature data, the second identity public key, and the target identity verification data to the authentication server, where the target identity verification data includes biometric feature information of a system user corresponding to the user terminal, and both the target authentication data and the target public key request data include the target identity verification identifier.

According to a third aspect of some embodiments of the present specification, an authentication server is provided, including: a request and public key acquisition unit, configured to obtain an identity confirmation request and a first identity public key, where the identity confirmation request is generated by a second service server based on a received cross-chain query request, the cross-chain query request is generated based on a cross-chain query operation that is sent by a user terminal and that is received by a first service server, and the first identity public key is stored in the first service server; a verification request acquisition and sending unit, configured to, in response to the identity confirmation request, obtain a target identity verification request and its corresponding target identity verification identifier that are used for identity verification, and send the target identity verification request and the first identity public key to the user terminal; an identity verification data acquisition unit, configured to obtain target private key signature data, a second identity public key, and target identity verification data, where the target identity verification data is collected by the user terminal based on the target identity verification request, the second identity public key is generated by the user terminal by using a key generator, and the target private key signature data is obtained by the user terminal by signing second signature data by using the second identity private key; a verification unit, configured to perform identity verification by using the target identity verification data, and verify whether the first identity public key and the second identity public key correspond to a same user; a data storage unit, configured to, when the identity verification succeeds and it is verified that the two identity public keys correspond to a same user, store obtained target authentication data to an authentication blockchain, where the target authentication data includes the target private key signature data and the target identity verification identifier; and a public key request data acquisition and sending unit, configured to obtain corresponding target public key request data based on the target identity verification request and send the target public key request data to the second service server, where the target public key request data includes the second identity public key.

According to a fourth aspect of some embodiments of the present specification, a user terminal is provided, including: a cross-chain query operation acquisition and sending unit, configured to, in a process of performing a service operation on a first blockchain stored in a first service server, obtain a cross-chain query operation specific to a second blockchain in a second service server, and send the cross-chain query operation to the first service server; a verification request acquisition unit, configured to obtain a target identity verification request and a first identity public key, where the target identity verification request is generated by an authentication server based on an identity confirmation request corresponding to the cross-chain query operation, and the first identity public key is stored in the first service server; a verification data collection unit, configured to collect corresponding target identity verification data in response to the target identity verification request; a key generation unit, configured to generate a target key pair including a second identity public key and a second identity private key by using a key generator; a signature data acquisition unit, configured to sign second signature data by using the second identity private key to obtain target private key signature data; a public key verification unit, configured to verify whether the first identity public key is valid; and a data sending unit, configured to, when it is verified that the first identity public key is valid, send the target private key signature data, the second identity public key, and the target identity verification data to the authentication server, where the target identity verification data includes biometric feature information of a system user corresponding to the user terminal, and both the target authentication data and the target public key request data include the target identity verification identifier.

According to a fifth aspect of some embodiments of the present specification, a cross-chain authentication system is further provided, including: a user terminal, configured to, in a process of performing a service operation on a first blockchain stored in a first service server, obtain a cross-chain query operation specific to a second blockchain in a second service server, and send the cross-chain query operation to the first service server; the first service server, configured to receive the cross-chain query operation, generate a corresponding cross-chain query request in response to the cross-chain query operation, and send the cross-chain query request and a first identity public key to the second service server, where the first identity public key is stored in the first service server; the second service server, configured to receive the cross-chain query request and the first identity public key, and generate an identity confirmation request based on the cross-chain query request; and send the identity confirmation request and the first identity public key to an authentication server; and the authentication server, configured to receive the identity confirmation request and the first identity public key, obtain, in response to the identity confirmation request, a target identity verification request and its corresponding target identity verification identifier that are used for identity verification, and send the target identity verification request and the first identity public key to the user terminal; where the user terminal is configured to receive the target identity verification request and the first identity public key, collect corresponding target identity verification data in response to the target identity verification request, generate a target key pair including a second identity public key and a second identity private key by using a key generator, and sign second signature data by using the second identity private key to obtain target private key signature data; verify whether the first identity public key is valid; and when it is verified that the first identity public key is valid, send the target private key signature data, the second identity public key, and the target identity verification data to the authentication server, where the target identity verification data includes biometric feature information of a system user corresponding to the user terminal; the authentication server is configured to receive the target private key signature data, the second identity public key, and the target identity verification data, perform identity verification by using the target identity verification data, and when the identity verification succeeds, store obtained target authentication data to an authentication blockchain; and obtain corresponding target public key request data based on the target identity verification request and send it to the second service server; and the second service server is configured to, after receiving the target public key request data, perform identity confirmation by using the target public key request data and the target authentication data; and when the identity confirmation succeeds, perform a query to obtain a service query result in response to the cross-chain query request, and return the service query result to the first service server.

According to a sixth aspect of some embodiments of the present specification, a server is further provided, including a memory, a processor, and a computer program that is stored in the memory and that can run on the processor, where when executing the program, the processor implements steps of the above-mentioned cross-chain authentication method.

According to a seventh aspect of some embodiments of the present specification, a user terminal is further provided, including a memory, a processor, and a computer program that is stored in the memory and that can run on the processor, where when executing the program, the processor implements steps of the above-mentioned cross-chain authentication method.

According to an eighth aspect of some embodiments of the present specification, a computer-readable storage medium is further provided, where the computer-readable storage medium stores a computer program, and the program can be executed by a processor to implement steps of the above-mentioned cross-chain authentication method.

Some embodiments of the present specification bring the following beneficial effects: Based on the above-mentioned technical solutions, after the identity confirmation request is obtained, identity verification is performed by collecting second verification data, and it is verified whether the generated second identity public key and the generated first identity public key correspond to a same user. When the identity verification succeeds and it is verified that the two identity public keys correspond to a same user, the target authentication data is stored to the authentication blockchain, and the target public key request data is sent to the second service server. As such, the second service server can perform identity confirmation based on the target public key request data and the target authentication data, and after the identity confirmation succeeds, identity confirmation can be performed across blockchains in response to the cross-chain query request, thereby further implementing cross-chain identity confirmation.

DESCRIPTION OF EMBODIMENTS

For better understanding of the above-mentioned technical solutions, the following describes in detail the technical solutions in some embodiments of the present specification by using the accompanying drawings and specific embodiments. It should be understood that, some embodiments of the present specification and specific features in some embodiments are detailed descriptions of the technical solutions in some embodiments of the present specification, but not limitations on the technical solutions in the present specification. Some embodiments in the present specification and the technical features in some embodiments can be mutually combined provided that no conflict occurs.

Figure 1:
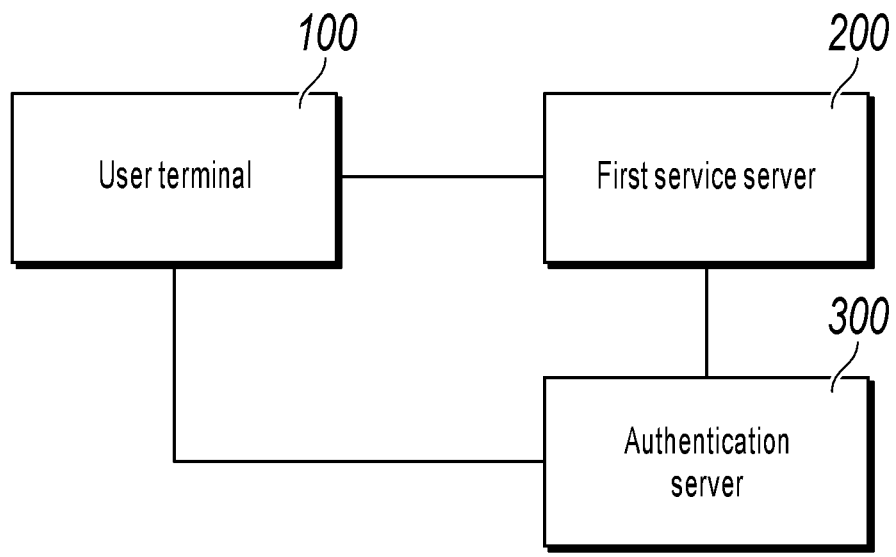
FIG. 1 is a system architectural diagram illustrating an identity public key application system in a blockchain authentication system, according to some embodiments of the present specification.

According to a first aspect, as shown in FIG. 1, some embodiments of the present specification provide an identity public key application system in a cross-chain authentication system, including: a user terminal 100, configured to obtain a blockchain operation request, and send the blockchain operation request and personal information of a system user corresponding to the user terminal 100 to a first service server 200; the first service server 200, configured to receive the blockchain operation request and the personal information; obtain, based on the blockchain operation request, corresponding block information of a first blockchain stored in the first service server 200; and query, by using the personal information, whether a first identity public key of the system user exists, when it is determined that the first identity public key does not exist, generate a first identity public key request used to apply for the first identity public key, and send the block information, the personal information, and the first identity public key request to an authentication server 300; the authentication server 300, configured to receive the block information, the personal information, and the first identity public key request; and in response to the first identity public key request, obtain a first identity verification request and its corresponding first identity verification identifier that are used for identity verification on the system user, and send the first identity verification request to the user terminal 100; where the user terminal 100 is configured to receive the first identity verification request, collect first identity verification data corresponding to the first identity verification request in response to the first identity verification request, generate a first key pair including a first identity public key and a first identity private key by using a key generator, sign first signature data by using the first identity private key to obtain first private key signature data, and send the first private key signature data, the first identity public key, and the first identity verification data to the authentication server 300, where the first signature data includes the personal information, and the first identity verification data includes biometric feature information of the system user; the authentication server 300 is configured to receive the first private key signature data, the first identity public key, and the first identity verification data, perform identity verification on the system user by using the first identity verification data, and when the identity verification succeeds, store first authentication data to an authentication blockchain stored in the authentication server 300; and obtain corresponding first public key request data based on the first identity public key request, and send the first public key request data to the first service server 200, where the first authentication data includes the first private key signature data, the first identity public key, the first identity verification data, the first identity verification identifier, a hash value and a timestamp of a user identifier of the system user, and the first public key request data includes the first identity verification identifier, the hash value of the user identifier of the system user, and a block hash value corresponding to a block of the first authentication data; and the first service server 200 is configured to receive the first public key request data, perform identity confirmation by using the first public key request data, store the first identity public key when the identity confirmation succeeds, and perform a corresponding service operation on the first blockchain in response to the blockchain operation request.

In some embodiments of the present specification, the personal information includes at least the user identifier of the system user and the biometric feature information of the system user, where the biometric feature information includes one or more of face information, fingerprint information, iris information, voiceprint information, and other information of the system user. Certainly, the personal information can further include certificate information of the system user, account and password information of the system user, etc.

In some embodiments of the present specification, the certificate information of the system user includes identity card information, passport information, or driver license information, etc. of the system user.

In some embodiments of the present specification, the user identifier of the system user can be a registration account of the system user on the authentication server 300 or identity information of the system user, etc.

In some embodiments of the present specification, when using the authentication server 300, the user terminal 100 registers the personal information to the authentication server 300, so that the authentication server 300 stores the personal information. Correspondingly, the authentication server 300 stores personal information of a system user corresponding to each user terminal that uses the authentication server 300. For example, if a user terminal 101 and a user terminal 102 also use the authentication server 300, the authentication server 300 stores the personal information of the system user corresponding to the user terminal 100, personal information of a system user corresponding to the user terminal 101, and personal information of a system user corresponding to the user terminal 102.

In some embodiments of the present specification, the user terminal 100 can be a smartphone, a notebook computer, a tablet computer, or a desktop computer, etc. The system user is a user who uses services provided by the first service server 200 and the authentication server 300.

In some embodiments of the present specification, the blockchain operation request includes a blockchain-specific data storage request and a blockchain-specific data query request, etc.

For example, a system user A is used as an example. When A uses the user terminal 100 to log in to a web page of the first service server 200, the user terminal 100 can obtain a login request for logging in to the web page of the first service server 200, where the login request is the blockchain operation request, and send the blockchain operation request and personal information of A to the first service server 200.

As such, the first service server 200 can receive the blockchain operation request and the personal information of A. In this case, the first service server 200 selects, as the first blockchain based on the blockchain operation request, a blockchain from at least one blockchain stored in the first service server 200, and obtains block information of the first blockchain, where the first blockchain corresponds to the blockchain operation request. In addition, the first service server 200 queries, by using the received personal information, whether a first identity public key of the system user exists, when it is determined that the first identity public key does not exist, generates a first identity public key request used to apply for the first identity public key, and sends the block information, the personal information, and the first identity public key request to the authentication server 300.

In this case, when selecting the first blockchain, the first service server 200 can randomly select a blockchain from the at least one blockchain as the first blockchain, and the block information of the first blockchain includes a hash value of the current block, a hash value of a previous block, a time stamp, and a sequence number of the current block.

After the first service server 200 sends the block information, the personal information, and the first identity public key request to the authentication server 300, the authentication server 300 receives the block information, the personal information, and the first identity public key request; and in response to the first identity public key request, obtains a first identity verification request and its corresponding first identity verification identifier that are used for identity verification on the system user, and sends the first identity verification request to the user terminal 100.

Specifically, when obtaining, in response to the first identity public key request, the first identity verification request and its corresponding first identity verification identifier that are used for identity verification on the system user, the authentication server 300 can determine, based on the personal information, a first identity verification method for performing identity verification, and then obtain the first identity verification request and the first identity verification identifier that correspond to the first identity verification method.

In some embodiments of the present specification, the first identity verification method includes at least verifying one or more types of the biometric feature information. For example, the first identity verification method can be, for example, successively verifying the face information, fingerprint information, and iris information, or merely verifying the iris information. Certainly, the first identity verification method can further include verifying the certificate information of the system user, verifying the account and password information of the system user, etc. For example, the first identity verification method can be, for example, successively verifying the face information, fingerprint information, and iris information and the identity card information of the system user, or successively verifying the face information, the identity card information of the system user, and the account and password information of the system user, or successively verifying the face information and the account and password information of the system user, etc.

For example, the first identity verification method is successively verifying the face information and fingerprint information. The authentication server 300 can determine, by using the personal information, that the first identity verification method for identity verification is successively verifying face information of A and fingerprint information of A, obtain the first identity verification request corresponding to the first identity verification method, and allocate the first identity verification identifier to A. The first identity verification identifier is unique, for example, the first identity verification identifier can be digits, letters, or a combination of digits and letters. After obtaining the first identity verification request, the authentication server 300 can further send the first identity verification request to the user terminal 100. In this case, the authentication server 300 can send, to the user terminal 100, code scanning prompt information for prompting the user terminal 100 of code scanning. In this case, the code scanning prompt information is the identity verification request. The authentication server 300 can further send the first identity verification request to the user terminal 100 in an active pushing mode.

In addition, after receiving the identity verification request, the user terminal 100 collects first identity verification data corresponding to the first identity verification request in response to the first identity verification request. In this case, because the first identity verification request includes the first identity verification method, the first identity verification data can be collected by using the first identity verification method. For example, when the first identity verification method is successively verifying the face information, fingerprint information, and iris information, the user terminal 100 successively collects the face information, fingerprint information, and iris information of A based on the first identity verification method, and uses the collected face information, fingerprint information, and iris information of A as the first identity verification data.

In addition, when the user terminal 100 generates the first key pair including the first identity public key and the first identity private key by using the key generator, the key generator is generated in an SE/TEE environment by using a service server identifier, a blockchain identifier, and a time offset. The time offset can be an annual offset, a monthly offset, or a daily offset, etc.

Specifically, because the key generator is generated in the SE/TEE environment by using the service server identifier, the blockchain identifier, and the time offset, when the first key pair is generated, the first service server identifier, the first blockchain identifier, and a time offset can be obtained, and then can be input into the key generator to obtain the first key pair.

Specifically, when obtaining the first service server identifier, the user terminal 100 can send a service identifier request to the first service server 200. The first service server 200 returns the first service server identifier to the user terminal 100 based on the received service identifier request. Correspondingly, when obtaining the first blockchain identifier, the user terminal 100 can send a blockchain identifier request to the first service server 200. The first service server 200 returns the first blockchain identifier to the user terminal 100 based on the received blockchain identifier request. The time offset is determined based on a predetermined start time point and a current time.

Specifically, the key generator can generate the first key pair based on the ECDSA algorithm.

A specific implementation process is as follows:

The nth first identity private key is as follows: $x=y+H(k\|i)$ (equation 1)

The nth first identity public key is as follows: $g^{\wedge}(xi)=g^{\wedge}(H(k\|i))*g^{\wedge}y$ (equation 2)

In equation 1 and equation 2, k represents a hash value of the service server identifier, y represents a hash value of the blockchain identifier, x is the first identity private key, i represents the time offset, n is an integer not less than 1, and $g^{\wedge}(xi)$ represents the first identity public key.

As such, the first key pair can be obtained by using equation 1 and equation 2. The user terminal 100 then sends the obtained first private key signature data, the first identity public key, and the first identity verification data to the authentication server 300.

A TEE provides proper security between an operating system and a security element (SE). As such, the first identity private key can be protected by using an independent security environment and hardware of the TEE/SE, reducing a risk of leaking the first identity private key. In addition, the key generator is generated based on three dimensions: the service server identifier, the blockchain identifier, and the time offset. Therefore, it can be ensured in multiple dimensions that the system user distributes different first identity private keys when operating on different service servers at different time points on different blockchains. There is no comprehensive data leakage risk even if the first identity private key is leaked.

In addition, the key generator generates the first key pair based on three dimensions: the service server identifier, the blockchain identifier, and the time offset. The three dimensions contain no parameter of the user terminal 100, so that when the device is replaced, the first key pair can be restored by using the key generator.

In some embodiments of the present specification, when performing identity verification by using the collected first identity verification data, the authentication server 300 can identify, based on the received first identity verification data, matching identity verification data from the personal information stored in the authentication server 300, and perform identity verification by using the first identity verification data and the matching identity verification data. During the identity verification performed by using the first identity verification data and the matching identity verification data, matching can be performed between the first identity verification data and the matching identity verification data. If the first identity verification data matches the matching identity verification data, it is determined that the identity verification succeeds. If the first identity verification data does not match the matching identity verification data, it is determined that the identity verification fails.

For example, after the user terminal 100 uses the collected face information, fingerprint information, and iris information of A as the first identity verification data, and sends the first identity verification data to the authentication server 300, because the personal information of A is stored in the authentication server 300, the user terminal 100 identifies face information, fingerprint information, and iris information of A from the stored personal information of A as the matching identity verification data, and then successively preforms matching on the face information, fingerprint information, and iris information in the matching identity verification data and in the first identity verification data. When the face information, fingerprint information, and iris information are all successfully matched, the user terminal 100 determines that the first identity verification data matches the matching identity verification data, and further determines that the identity verification succeeds. When at least one piece information in the face information, fingerprint information, and iris information fails to be matched, the user terminal 100 determines that the first identity verification data does not match the matching identity verification data, and further determines that the identity verification fails.

In some embodiments of the present specification, when performing identity confirmation by using the first public key request data, the first service server 200 can identify the first authentication data from the authentication blockchain by using the block hash value in the first public key request data, and perform the identity confirmation by using the first authentication data and the first public key request data. In this case, matching can be performed between the first identity verification identifiers included in the first authentication data and in the first public key request data, or between the hash values of the user identifiers included in the first authentication data and in the first public key request data, or between the first identity verification identifiers and the hash values of the user identifiers included in the first authentication data and in the first public key request data. When all to-be-matched data included in the first authentication data and in the first public key request data is successfully matched, it is determined that the identity confirmation succeeds, or otherwise, the identity confirmation fails.

For example, after identifying the first authentication data by using the first public key request data, the first service server 200 detects whether the first identity verification identifiers in the first authentication data and in the first public key request data are the same, and detects whether the hash values of the user identifiers in the first authentication data and in the first public key request data are the same. If it is detected that the first identity verification identifiers in the first authentication data and in the first public key request data are both 120, the first service server 200 determines that the first identity verification identifiers in the first authentication data and in the first public key request data are the same. If it is detected that the hash values of the user identifiers in the first authentication data and in the first public key request data are both 010111, the first service server 200 determines that the hash values of the user identifiers in the first authentication data and in the first public key request data are the same. If both the first identity verification identifiers and the hash values of the user identifiers are the same, the first service server 200 determines that the identity confirmation succeeds, or otherwise, the identity confirmation fails.

In this case, the first authentication data is stored in the authentication blockchain and is tamper-resistant. As such, when identity confirmation is performed by using the first authentication data and the first public key request data, accuracy of a determining result of the identity confirmation is relatively high. In addition, if identity confirmation is performed by using the first authentication data and the first public key request data, it can be determined that the identity confirmation succeeds only when all to-be-matched data included in the first authentication data and in the first public key request data is successfully matched. Therefore, an increased amount of matching data leads to improved accuracy of a determining result, and a reduced amount of matching data leads to a data theft risk.

In addition, when identity confirmation is performed by using the first public key request data, to improve accuracy of identity confirmation, after the identity confirmation performed by using the first authentication data and the first public key request data succeeds, the first authentication data can be further identified by using the first public key request data, and then the first private key signature data in the first authentication data can be obtained. Then, the first identity public key can be used to decrypt the first private key signature data to obtain decrypted signature data. Afterwards, the decrypted signature data can be compared with the unencrypted signature data. If they are the same, it is determined that the identity confirmation succeeds, or otherwise, the identity confirmation fails.

Figure 2:
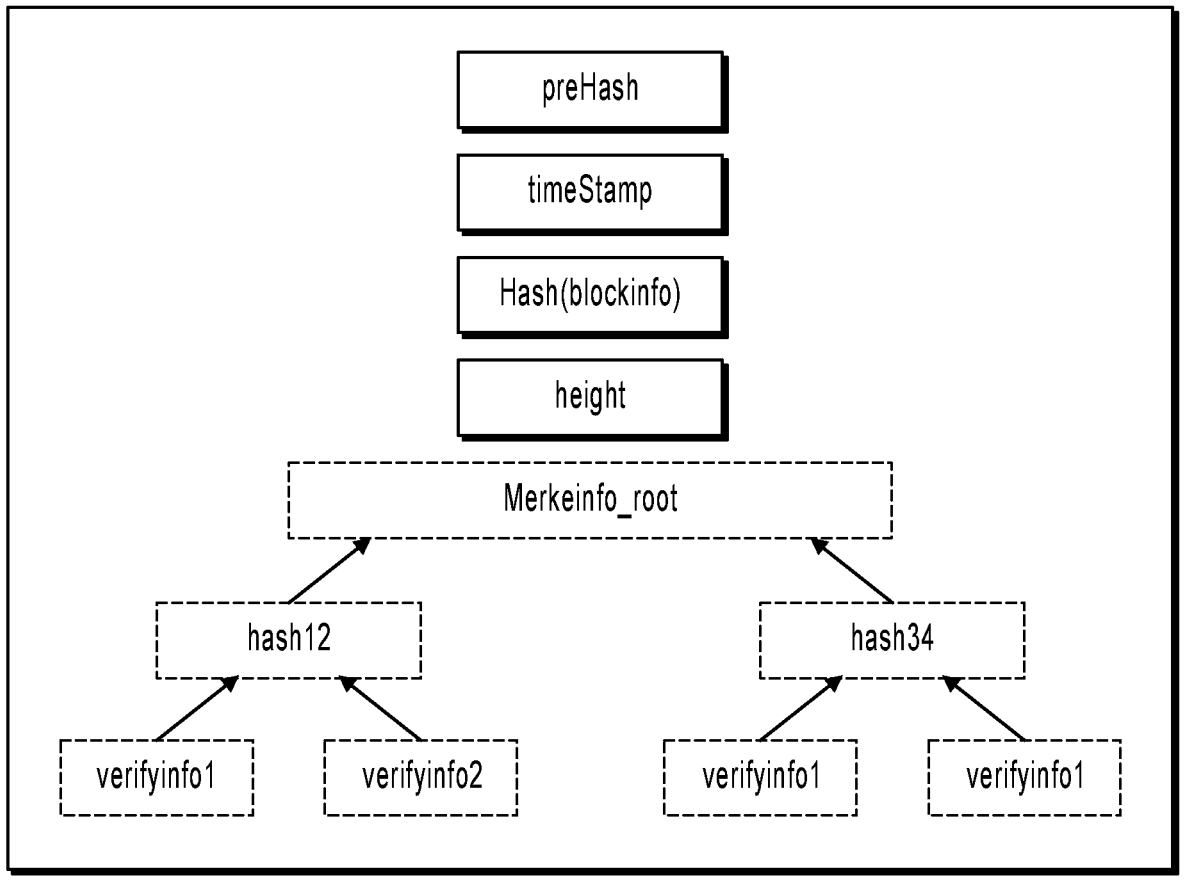
FIG. 2 is a schematic structural diagram illustrating a data structure of a block of target authentication data, according to some embodiments of the present specification.

In some embodiments of the present specification, when the authentication server 300 stores the first authentication data to the authentication blockchain, a data structure of a block that stores the first authentication data on the authentication blockchain is shown in FIG. 2. The authentication blockchain can be a public blockchain, a consortium blockchain, or a private blockchain. The authentication blockchain uses the PBFT consensus algorithm, and satisfies a requirement of n=3f+1, where n is a total quantity of nodes, and f is a quantity of nodes that allow for exceptions.

Referring to FIG. 2, in a data structure of blocks on the authentication blockchain, preHash points to a hash value of a previous block; timeStamp is a timestamp for packaging a block; Hash(blockInfo) is a hash value of current block content, which mainly applies SHA256; height mainly indicates a sequence number of a current block, or can be understood as a block sequence number. MerkeInfo_root is a root node of a Merkle tree. A leaf node verifyInfo of MerkeInfo_root indicates mainly authentication process information. One identity verification process corresponds to one verifyInfo leaf node. verifyInfo is main content in a JSON format and is signed by using the first identity private key. Main content of verifyInfo is {a first identity verification identifier, identity verification product details, a timestamp, an identity verification result, a public key applied for authentication, a first identity private key signature}.

In an actual application process, an identity verification APP corresponding to the authentication server 300 is installed in the user terminal 100, the user terminal 100 performs data exchange with the identity verification processor 300 by using the identity verification APP, and the user terminal 100 sends the collected first identity verification data to the authentication server 300 by using the identity verification APP.

Figure 3:
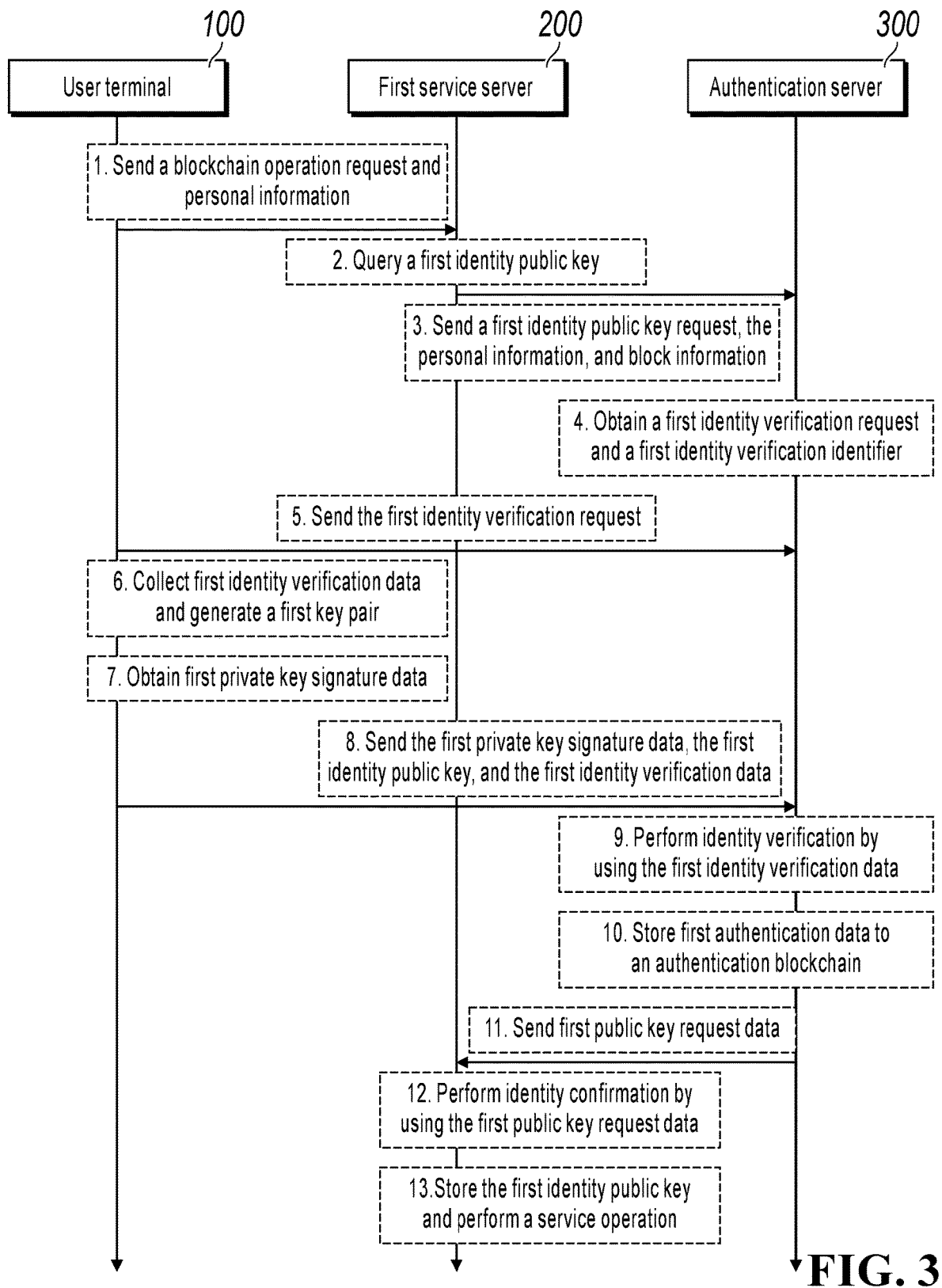
FIG. 3 is a flowchart illustrating steps performed by devices in an identity public key application system, according to some embodiments of the present specification.

FIG. 3 shows an execution process of a service blockchain authentication system, according to some embodiments of the present specification. A mobile terminal 100 first performs step 1: sending a blockchain operation request and personal information. After receiving the blockchain operation request and the personal information, a first service server 200 performs step 2: querying a first identity public key and obtaining block information of a first blockchain. When failing to identify the first identity public key in step 2, the first service server 200 performs step 3: sending a first identity public key request, the personal information, and the block information.

In some embodiments of the present specification, after receiving the first identity public key request, the personal information, and the block information, an authentication server 300 performs step 4: obtaining a first identity verification request and a first identity verification identifier. After obtaining the first identity verification request, the authentication server 300 performs step 5: sending the first identity verification request.

In some embodiments of the present specification, after receiving the first identity verification request, the user terminal 100 performs step 6: collecting first identity verification data and generating a first key pair. Then, the user terminal 100 performs step 7: obtaining first private key signature data, that is, signing first signature data by using a first identity private key in the first key pair to obtain the first private key signature data. Afterwards, the user terminal 100 performs step 8: sending the first private key signature data, the first identity public key, and the first identity verification data.

After receiving the first private key signature data, the first identity public key, and the first identity verification data, the authentication server 300 performs step 9: performing identity verification by using the first identity verification data. When the identity verification succeeds, the authentication server 300 performs step 10: storing first authentication data to an authentication blockchain, and performs step 11: sending first public key request data.

After receiving the first public key request data, the first service server 200 performs step 12: performing identity confirmation by using the first public key request data. When the identity confirmation succeeds, the first service server 200 performs step 13: storing the first identity public key and performing a service operation.

Figure 4:
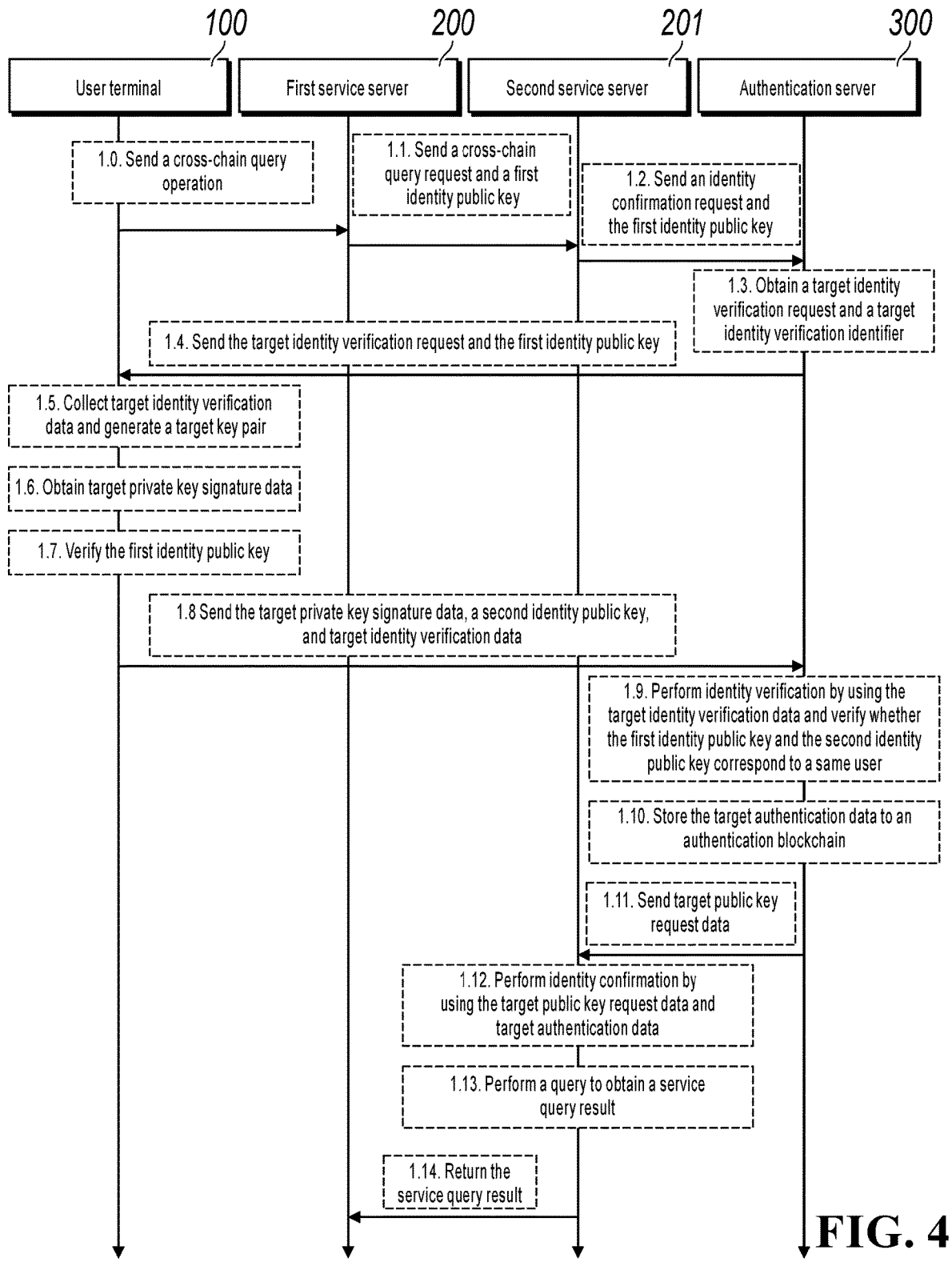
FIG. 4 is a flowchart illustrating steps performed by devices in a cross-chain authentication system, according to some embodiments of the present specification.

In some embodiments of the present specification, FIG. 4 is a flowchart illustrating steps performed by devices in a cross-chain authentication system. A user terminal 100 performs step 1.0: sending a cross-chain query operation. During execution of step 1.0, the user terminal 100 obtains a cross-chain query operation specific to a second blockchain in a second service server 201 and sends the cross-chain query operation to a first service server 200 in a process of performing a service operation on a first blockchain stored in the first service server 200. As such, the first service server receives the cross-chain query operation. In this case, the first service server 200 performs step 1.1: sending a cross-chain query request and a first identity public key. During execution of step 1.1, when obtaining the cross-chain query operation, the first service server 200 generates the cross-chain query request in response to the cross-chain query operation. Specifically, when obtaining the cross-chain query operation, the first service server 200 can obtain a target service server corresponding to the cross-chain query operation as the second service server 201, and then generate the cross-chain query request. Then, the first service server 200 sends the cross-chain query request and the first identity public key to the second service server 201.

After receiving the cross-chain query request and the first identity public key, the second service server 201 performs step 1.2: sending an identity confirmation request and the first identity public key. During execution of step 1.2, because the first service server 200 has completed an identity verification procedure, the second service server 201 needs to determine, after receiving the cross-chain query request, whether the system user can operate the second service server 201. As such, the second service server 201 can generate the identity confirmation request based on the cross-chain query request, and performs identity confirmation by sending the identity confirmation request and the first identity public key to the authentication server 300.

In some embodiments of the present specification, after receiving the identity confirmation request and the first identity public key, the authentication server 300 performs step 1.3: obtaining a target identity verification request and a target identity verification identifier. After obtaining the target identity verification request, the authentication server 300 performs step 1.4: sending the target identity verification request and the first identity public key.

Specifically, during execution of step 1.3, the authentication server 300 obtains, in response to the identity confirmation request, the target identity verification request and its corresponding target identity verification identifier that are used for identity verification, and then performs step 1.4.

In some embodiments of the present specification, the second identity verification method includes at least verifying one or more types of biometric feature information. For example, the second identity verification method can be, for example, successively verifying face information, fingerprint information, and iris information, or merely verifying iris information. Certainly, the second identity verification method can further include verifying certificate information of the system user, verifying account and password information of the system user, etc. For a specific implementation process of the second identity verification method, reference can be made to the description of the first identity verification method. Details are omitted here for brevity of the present specification.

In some embodiments of the present specification, after receiving the target identity verification request and the first identity public key, the user terminal 100 performs step 1.5: collecting target identity verification data and generating a target key pair. Then, the user terminal 100 performs step 1.6: obtaining target private key signature data, that is, signing first signature data by using a second identity private key in the target key pair to obtain the target private key signature data. Afterwards, the user terminal 100 performs step 1.7: verifying the first identity public key. When verifying that the first identity public key is valid in step 1.7, the user terminal 100 performs step 1.8: sending the target private key signature data, the second identity public key, and the target identity verification data.

Specifically, during execution of step 1.5, after receiving the target identity verification request, the user terminal 100 collects the corresponding target identity verification data in response to the target identity verification request. In this case, because the target identity verification request includes the second identity verification method, the target identity verification data can be collected by using the second identity verification method.

In some embodiments of the present specification, for a specific implementation process of collecting the target identity verification data, reference can be made to the description of collecting the first identity verification data. Details are omitted here for brevity of the present specification.

In addition, when the user terminal 100 generates the target key pair including the second identity public key and the second identity private key by using the key generator, the key generator is generated in an SE/TEE environment by using a service server identifier, a blockchain identifier, and a time offset. The time offset can be an annual offset, a monthly offset, or a daily offset, etc.

Specifically, because the key generator is generated in the SE/TEE environment by using the service server identifier, the blockchain identifier, and the time offset, when the target key pair is generated, the second service server identifier, the second blockchain identifier, and a time offset can be obtained, and then can be input into the key generator to obtain the target key pair.

Specifically, when obtaining the second service server identifier, the user terminal 100 can send a service identifier request to the second service server 201. The second service server 201 returns the second service server identifier to the user terminal 100 based on the received service identifier request. Correspondingly, when obtaining the second blockchain identifier, the user terminal 100 can send a blockchain identifier request to the second service server 201. The second service server 201 returns the second blockchain identifier to the user terminal 100 based on the received blockchain identifier request. The time offset is determined based on a predetermined start time point and a current time.

In some embodiments of the present specification, for a specific implementation process of generating the target key pair by using the key generator, reference can be made to the description of generating the first key pair by using the key generator. Details are omitted here for brevity of the present specification.

In some embodiments of the present specification, during execution of step 1.6, the user terminal 100 obtains the target private key signature data by signing second signature data by using the second identity private key, where the second signature data includes the personal information, and the target identity verification data includes biometric feature information of the system user.

In some embodiments of the present specification, during execution of step 1.7, the user terminal 100 can verify the first identity public key by using the first identity private key. Specifically, the user terminal 100 can encrypt verification data by using the first identity private key, and decrypt the encrypted verification data by using the first identity public key to obtain decrypted data; then, determine whether the verification data and the decrypted data are the same to obtain a determining result; verify, by using the determining result, whether the first identity public key is valid; and if the determining result indicates that the verification data and the decrypted data are the same, determine that the first identity public key is valid; or if the determining result indicates that the verification data and the decrypted data are different, determine that the first identity public key is invalid. The verification data can be any data, such as 010101 or 00111100, etc.

For example, during execution of step 1.7, the user terminal 100 first encrypts the verification data 010101 by using the first identity private key stored in the user terminal 100 to obtain encrypted data 111100000, and then decrypt 111100000 by using the first identity public key to obtain decrypted data 010101. In this case, because the decrypted data and the verification data are the same, it is determined that the first identity public key is valid.

In some embodiments of the present specification, when verifying that the first identity public key is valid in step 1.7, the user terminal 100 performs step 1.8: sending the target private key signature data, the second identity public key, and the target identity verification data to the authentication server 300.

After receiving the target private key signature data, the second identity public key, and the target identity verification data, the authentication server 300 performs step 1.9: performing identity verification by using the target identity verification data and verify whether the first identity public key and the second identity public key correspond to a same user. When the identity verification succeeds and it is verified that the two identity public keys correspond to a same user, the authentication server 300 performs step 1.10: storing the target authentication data to an authentication blockchain, and performs step 1.11: sending target public key request data.

In some embodiments of the present specification, the target authentication data includes the target private key signature data, the second identity public key, the target identity verification data, the target identity verification identifier, a hash value of a user identifier of the system user, and a timestamp. The target public key request data includes the target identity verification identifier, the hash value of the user identifier of the system user, and a block hash value corresponding to a block of the target authentication data.

In some embodiments of the present specification, during execution of step 1.9, when performing identity verification by using the target identity verification data, the authentication server 300 can identify, based on the received target identity verification data, target identity verification data from the personal information stored in the authentication server 300, and perform identity verification by using the received target identity verification data and the identified target identity verification data. During the identity verification performed by using the received target identity verification data and the identified target identity verification data, matching can be performed between the received target identity verification data and the identified target identity verification data. If the received target identity verification data matches the identified target identity verification data, it is determined that the identity verification succeeds. If the received target identity verification data does not match the identified target identity verification data, it is determined that the identity verification fails.

For example, after the user terminal 100 uses collected face information, fingerprint information, and iris information of A as the target identity verification data, and sends the target identity verification data to the authentication server 300, because personal information of A is stored in the authentication server 300, the user terminal 100 identifies face information, fingerprint information, and iris information of A from the stored personal information of A as the identified target identity verification data, and then successively preforms matching on the face information, fingerprint information, and iris information in the target identity verification data and in the identified target identity verification data. When the face information, fingerprint information, and iris information are all successfully matched, the user terminal 100 determines that the target identity verification data matches the identified target identity verification data, and further determines that the identity verification succeeds. When at least one piece information in the face information, fingerprint information, and iris information fails to be matched, the user terminal 100 determines that the target identity verification data does not match the identified target identity verification data, and further determines that the identity verification fails.

In some embodiments of the present specification, during execution of step 1.9, when verifying whether the first identity public key and the second identity public key correspond to a same user, the authentication server 300 can obtain a first hash value by performing hash on a user identifier of a system user corresponding to the first identity public key, obtain a second hash value by performing hash on a user identifier of a system user corresponding to the second identity public key, detect whether the first hash value is the same as the second hash value to obtain a detection result, and verify, based on the detection result, whether the first identity public key and the second identity public key correspond to a same user. If the detection result indicates that the first hash value is the same as the second hash value, the authentication server 300 determines that the first identity public key and the second identity public key correspond to a same user; or if the detection result indicates that the first hash value is different from the second hash value, the authentication server 300 determines that the first identity public key and the second identity public key correspond to different users.

In some embodiments of the present specification, the authentication server 300 performs step 1.10 when the identity verification succeeds and it is verified that the two identity public keys correspond to a same user. In addition, during execution of step 1.10, when the authentication server 300 stores the target authentication data to the authentication blockchain, a data structure of a block that stores the target authentication data on the authentication blockchain is shown in FIG. 2. The authentication blockchain can be a public blockchain, a consortium blockchain, or a private blockchain. The authentication blockchain uses the PBFT consensus algorithm, and satisfies a requirement of n=3f+1, where n is a total quantity of nodes, and f is a quantity of nodes that allow for exceptions.

Referring to FIG. 2, in a data structure of blocks on the authentication blockchain, preHash points to a hash value of a previous block; timeStamp is a timestamp for packaging a block; Hash(blockInfo) is a hash value of current block content, which mainly applies SHA256; height mainly indicates a sequence number of a current block, or can be understood as a block sequence number. MerkeInfo_root is a root node of a Merkle tree. A leaf node verifyInfo of MerkeInfo_root indicates mainly authentication process information. One identity verification process corresponds to one verifyInfo leaf node. verifyInfo is mainly content in a JSON format and is signed by using the second identity private key. Main content of verifyInfo is {a target identity verification identifier, identity verification product details, a timestamp, an identity verification result, a public key applied for authentication, a second identity private key signature}.

In some embodiments of the present specification, during execution of step 1.11, the authentication server 300 sends the target public key request data to the second service server 201.

In addition, after receiving the target public key request data, the second service server 201 performs step 1.12: performing identity confirmation by using the target public key request data and the target authentication data. When the identity confirmation succeeds, the second service server 201 performs step 1.13: performing a query to obtain a service query result. After obtaining the service query result, the second service server 201 performs step 1.14: returning the service query result.

In some embodiments of the present specification, during execution of step 1.12 by the second service server 201, when performing identity confirmation by using the target public key request data, the second service server 201 can identify the target authentication data from the authentication blockchain by using the block hash value in the target public key request data, and perform the identity confirmation by using the target authentication data and the target public key request data. In this case, matching can be performed between the target identity verification identifiers included in the target authentication data and in the target public key request data, or between the hash values of the user identifiers included in the target authentication data and in the target public key request data, or between the target identity verification identifiers and the hash values of the user identifiers included in the target authentication data and in the target public key request data. When all to-be-matched data included in the target authentication data and in the target public key request data is successfully matched, it is determined that the identity confirmation succeeds, or otherwise, the identity confirmation fails.

In addition, when identity confirmation is performed by using the target public key request data, to improve accuracy of identity confirmation, after the identity confirmation performed by using the target authentication data and the target public key request data succeeds, the target authentication data can be further identified by using the target public key request data, and then the target private key signature data in the target authentication data can be obtained. Then, the second identity public key can be used to decrypt the target private key signature data to obtain decrypted signature data. Afterwards, the decrypted signature data can be compared with the unencrypted signature data. If they are the same, it is determined that the identity confirmation succeeds, or otherwise, the identity confirmation fails.

In some embodiments of the present specification, for a specific implementation process of performing identity confirmation by the second service server 201 by using the target public key request data, reference can be made to the description of performing identity confirmation by the first service server 200 by using the first public key request data. Details are omitted here for brevity of the present specification.

In some embodiments of the present specification, when determining that the identity confirmation succeeds in step 1.12, the second service server 201 first performs step 1.13. During step 1.13, the second service server 201 performs the query to obtain the service query result in response to the cross-chain query request. After obtaining the service query result in step 1.13, the second service server 201 performs step 1.14 to return the service query result to the first service server 200, so as to complete the cross-chain query operation.

As such, a user authentication service is implemented by using the authentication server 300, implementing identity public key sending and cross-chain identity confirmation, while ensuring that multiple identity public keys are mutually independent, secure, and reliable. In the authentication process, the authentication data is stored to the authentication blockchain, implementing traceable, repudiation-resistant, and tamper-resistant data.

According to a second aspect, based on a same inventive concept as the first aspect, some embodiments of the present specification provide a cross-chain authentication method, where the method is applied to an authentication server and includes the following steps:

S102: Obtain an identity confirmation request and a first identity public key, where the identity confirmation request is generated by a second service server based on a received cross-chain query request, the cross-chain query request is generated based on a cross-chain query operation that is sent by a user terminal and that is received by a first service server, and the first identity public key is stored in the first service server.

S104: In response to the identity confirmation request, obtain a target identity verification request and its corresponding target identity verification identifier that are used for identity verification, and send the target identity verification request and the first identity public key to the user terminal.

S106: Obtain target private key signature data, a second identity public key, and target identity verification data, where the target identity verification data is collected by the user terminal based on the target identity verification request, the second identity public key is generated by the user terminal by using a key generator, and the target private key signature data is obtained by the user terminal by signing second signature data by using the second identity private key.

S108: Perform identity verification by using the target identity verification data, and verify whether the first identity public key and the second identity public key correspond to a same user; and when the identity verification succeeds and it is verified that the two identity public keys correspond to a same user, store obtained target authentication data to an authentication blockchain, where the target authentication data includes the target private key signature data and the target identity verification identifier.

S110: Obtain corresponding target public key request data based on the target identity verification request and send the target public key request data to the second service server, where the target public key request data includes the second identity public key.

In some implementations of the present specification, the authentication server stores personal information of a system user corresponding to the user terminal, and the personal information includes at least a user identifier of the system user and biometric feature information of the system user.

In some implementations of the present specification, the performing identity verification by using the target identity verification data specifically includes the following: identifying, based on the received target identity verification data, target identity verification data from the personal information stored in the authentication server, and performing the identity verification by using the identified target identity verification data and the received target identity verification data.

In some implementations of the present specification, the target authentication data further includes the second identity public key, the target identity verification data, and a hash value and a timestamp of a user identifier of the system user, and the target public key request data further includes the hash value of the user identifier of the system user and a block hash value corresponding to a block of the target authentication data.

In some implementations of the present specification, the verifying whether the first identity public key and the second identity public key correspond to a same user specifically includes the following: obtaining a first hash value obtained by performing hash on a user identifier of a system user corresponding to the first identity public key; obtaining a second hash value obtained by performing hash on a user identifier of a system user corresponding to the second identity public key; detecting whether the first hash value is the same as the second hash value to obtain a detection result; and verifying, based on the detection result, whether the first identity public key and the second identity public key correspond to a same user.

According to a third aspect, based on a same inventive concept as the first aspect, some embodiments of the present specification provide a cross-chain authentication method, where the method is applied to a user terminal and includes the following steps:

S202: In a process of performing a service operation on a first blockchain stored in a first service server, obtain a cross-chain query operation specific to a second blockchain in a second service server, and send the cross-chain query operation to the first service server.

S204: Obtain a target identity verification request and a first identity public key, where the target identity verification request is generated by an authentication server based on an identity confirmation request corresponding to the cross-chain query operation, and the first identity public key is stored in the first service server.

S206: Collect corresponding target identity verification data in response to the target identity verification request, generate a target key pair including a second identity public key and a second identity private key by using a key generator, and sign second signature data by using the second identity private key to obtain target private key signature data; verify whether the first identity public key is valid; and when it is verified that the first identity public key is valid, send the target private key signature data, the second identity public key, and the target identity verification data to the authentication server, where the target identity verification data includes biometric feature information of a system user corresponding to the user terminal, and both the target authentication data and the target public key request data include the target identity verification identifier.

In some implementations of the present specification, the generating a target key pair including a second identity public key and a second identity private key by using a key generator specifically includes the following: obtaining a second service server identifier, a second blockchain identifier, and a time offset; and inputting the second service server identifier, the second blockchain identifier, and the time offset into the key generator to obtain the target key pair.

In some implementations of the present specification, the verifying whether the first identity public key is valid specifically includes the following: encrypting verification data by using the first identity private key; decrypting the encrypted verification data by using the first identity public key to obtain decrypted data; determining whether the verification data is the same as the decrypted data to obtain a determining result; and verifying, by using the determining result, whether the first identity public key is valid.

Figure 5:
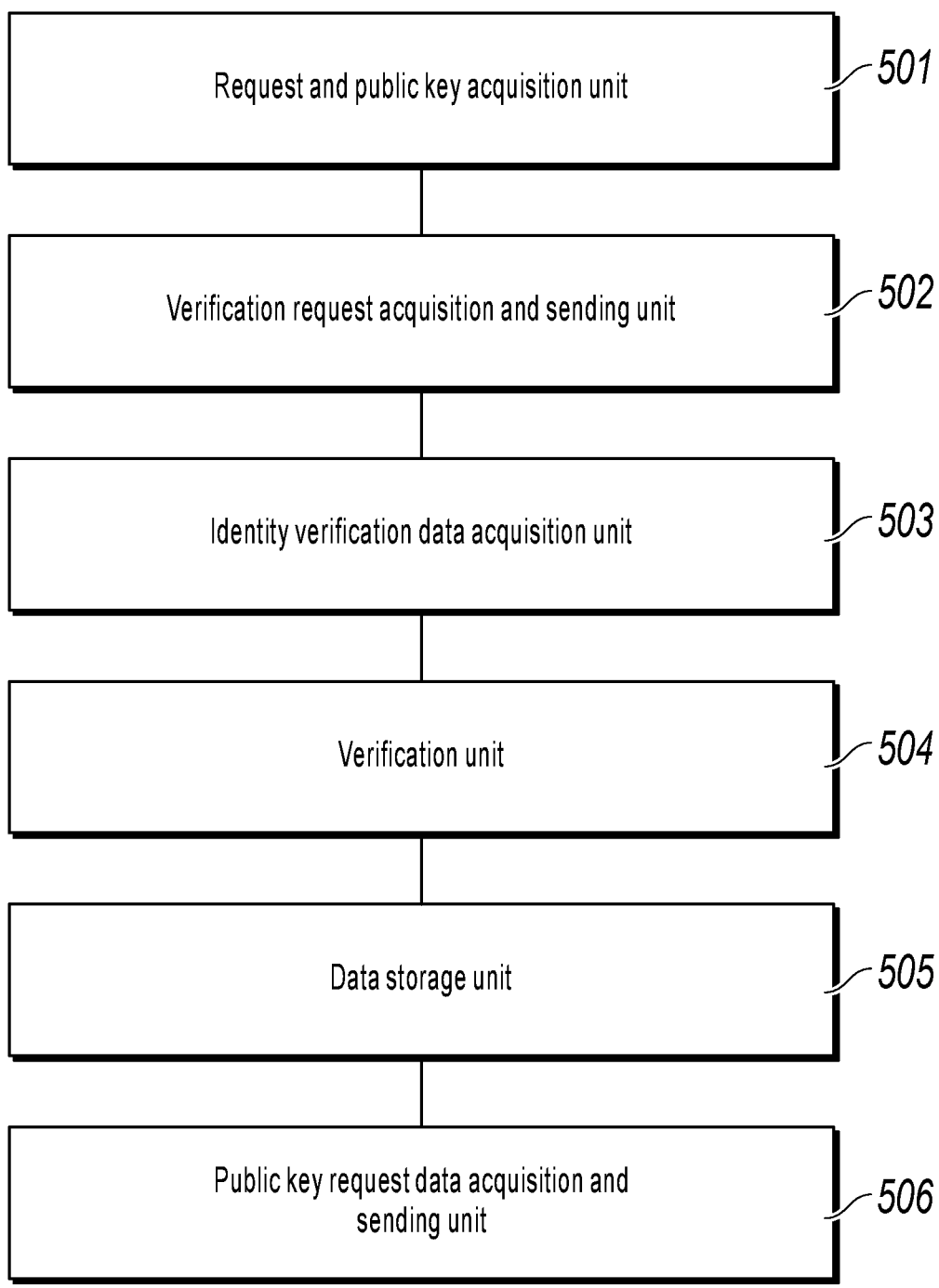
FIG. 5 is a schematic structural diagram illustrating an authentication server, according to some embodiments of the present specification.

According to a fourth aspect, based on a same inventive concept as the second aspect, some embodiments of the present specification provide an authentication server, as shown in FIG. 5, including: a request and public key acquisition unit 501, configured to obtain an identity confirmation request and a first identity public key, where the identity confirmation request is generated by a second service server based on a received cross-chain query request, the cross-chain query request is generated based on a cross-chain query operation that is sent by a user terminal and that is received by a first service server, and the first identity public key is stored in the first service server; a verification request acquisition and sending unit 502, configured to, in response to the identity confirmation request, obtain a target identity verification request and its corresponding target identity verification identifier that are used for identity verification, and send the target identity verification request and the first identity public key to the user terminal; an identity verification data acquisition unit 503, configured to obtain target private key signature data, a second identity public key, and target identity verification data, where the target identity verification data is collected by the user terminal based on the target identity verification request, the second identity public key is generated by the user terminal by using a key generator, and the target private key signature data is obtained by the user terminal by signing second signature data by using the second identity private key; a verification unit 504, configured to perform identity verification by using the target identity verification data, and verify whether the first identity public key and the second identity public key correspond to a same user; a data storage unit 505, configured to, when the identity verification succeeds and it is verified that the two identity public keys correspond to a same user, store obtained target authentication data to an authentication blockchain, where the target authentication data includes the target private key signature data and the target identity verification identifier; and a public key request data acquisition and sending unit 506, configured to obtain corresponding target public key request data based on the target identity verification request and send the target public key request data to the second service server, where the target public key request data includes the second identity public key.

In some implementations of the present specification, the authentication server stores personal information of a system user corresponding to the user terminal, and the personal information includes at least a user identifier of the system user and biometric feature information of the system user.

In some implementations of the present specification, the verification unit 504 is specifically configured to identify, based on the received target identity verification data, target identity verification data from the personal information stored in the authentication server, and perform the identity verification by using the identified target identity verification data and the received target identity verification data.

In some implementations of the present specification, the target authentication data further includes the second identity public key, the target identity verification data, and a hash value and a timestamp of a user identifier of the system user, and the target public key request data further includes the hash value of the user identifier of the system user and a block hash value corresponding to a block of the target authentication data.

In some implementations of the present specification, the verification unit 504 is specifically configured to obtain a first hash value obtained by performing hash on a user identifier of a system user corresponding to the first identity public key; obtain a second hash value obtained by performing hash on a user identifier of a system user corresponding to the second identity public key; detect whether the first hash value is the same as the second hash value to obtain a detection result; and verify, based on the detection result, whether the first identity public key and the second identity public key correspond to a same user.

Figure 6:
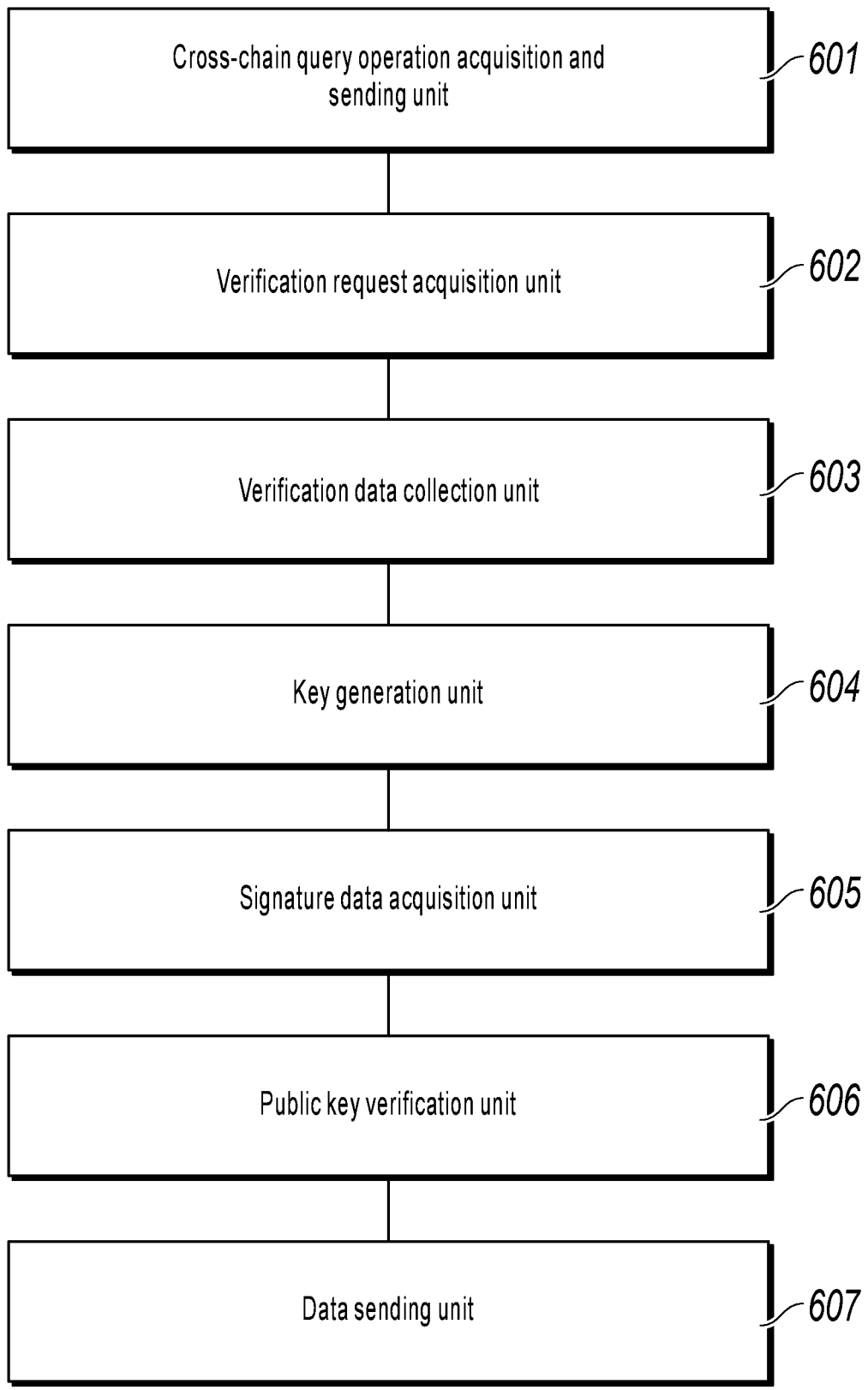
FIG. 6 is a first schematic structural diagram illustrating a user terminal, according to some embodiments of the present specification.

According to a fifth aspect, based on a same inventive concept as the third aspect, some embodiments of the present specification provide a user terminal, as shown in FIG. 6, including: a cross-chain query operation acquisition and sending unit 601, configured to, in a process of performing a service operation on a first blockchain stored in a first service server, obtain a cross-chain query operation specific to a second blockchain in a second service server, and send the cross-chain query operation to the first service server; a verification request acquisition unit 602, configured to obtain a target identity verification request and a first identity public key, where the target identity verification request is generated by an authentication server based on an identity confirmation request corresponding to the cross-chain query operation, and the first identity public key is stored in the first service server; a verification data collection unit 603, configured to collect corresponding target identity verification data in response to the target identity verification request; a key generation unit 604, configured to generate a target key pair including a second identity public key and a second identity private key by using a key generator; a signature data acquisition unit 605, configured to sign second signature data by using the second identity private key to obtain target private key signature data; a public key verification unit 606, configured to verify whether the first identity public key is valid; and a data sending unit 607, configured to, when it is verified that the first identity public key is valid, send the target private key signature data, the second identity public key, and the target identity verification data to the authentication server, where the target identity verification data includes biometric feature information of a system user corresponding to the user terminal, and both the target authentication data and the target public key request data include the target identity verification identifier.

In some implementations of the present specification, the key generation unit 604 is specifically configured to obtain a second service server identifier, a second blockchain identifier, and a time offset; and input the second service server identifier, the second blockchain identifier, and the time offset into the key generator to obtain the target key pair.

In some implementations of the present specification, the public key verification unit 606 is specifically configured to encrypt verification data by using the first identity private key; decrypt the encrypted verification data by using the first identity public key to obtain decrypted data; determine whether the verification data is the same as the decrypted data to obtain a determining result; and verify, by using the determining result, whether the first identity public key is valid.

Figure 7:
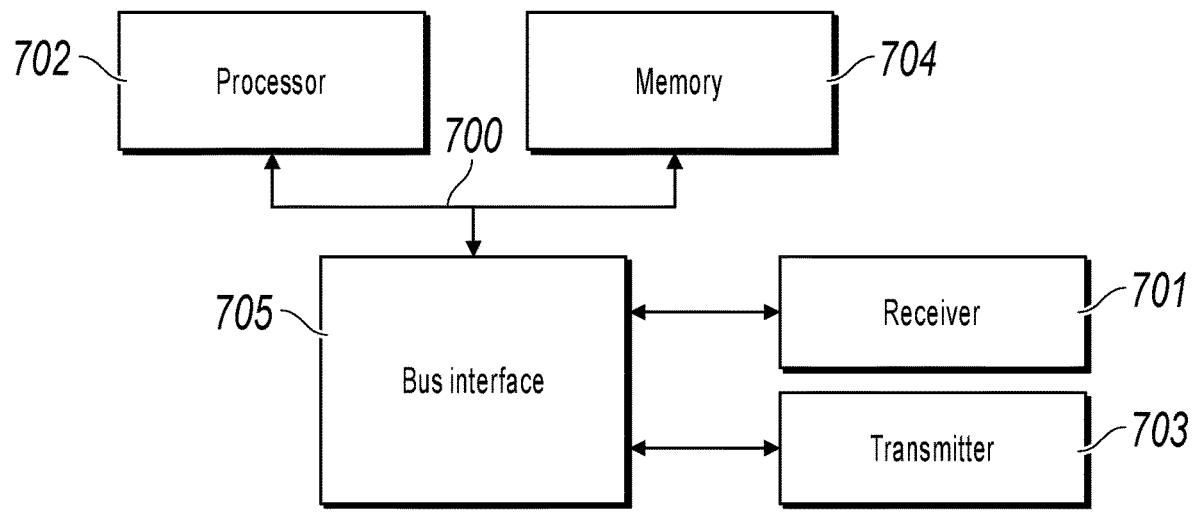
FIG. 7 is a schematic structural diagram illustrating a server, according to some embodiments of the present specification.

According to a sixth aspect, based on a same inventive concept as the cross-chain authentication methods in the above-mentioned embodiments, some embodiments of the present specification further provide a server. As shown in FIG. 7, the server includes a memory 704, a processor 702, and a computer program that is stored in the memory 704 and that can run on the processor 702. When executing the program, the processor 702 implements steps of any of the above-mentioned cross-chain authentication methods.

In FIG. 7, for a bus architecture (indicated by using a bus 700), the bus 700 can include any quantity of interconnected buses and bridges, and the bus 700 interconnects various circuits including one or more processors represented by the processor 702 and one or more memories represented by the memory 704. The bus 700 can further link various other circuits such as a peripheral device, a voltage regulator, and a power management circuit, which are well known in the art and therefore are not further described in the present specification. A bus interface 705 provides an interface between the bus 700 and a receiver 701, and an interface between the bus 700 and a transmitter 703. The receiver 701 and the transmitter 703 can be a same component, that is, a transceiver, which provides a unit configured to communicate with various other apparatuses on a transmission medium. The processor 702 is responsible for management of the bus 700 and general processing, and the memory 704 can be configured to store data used when the processor 702 performs an operation.

Figure 8:
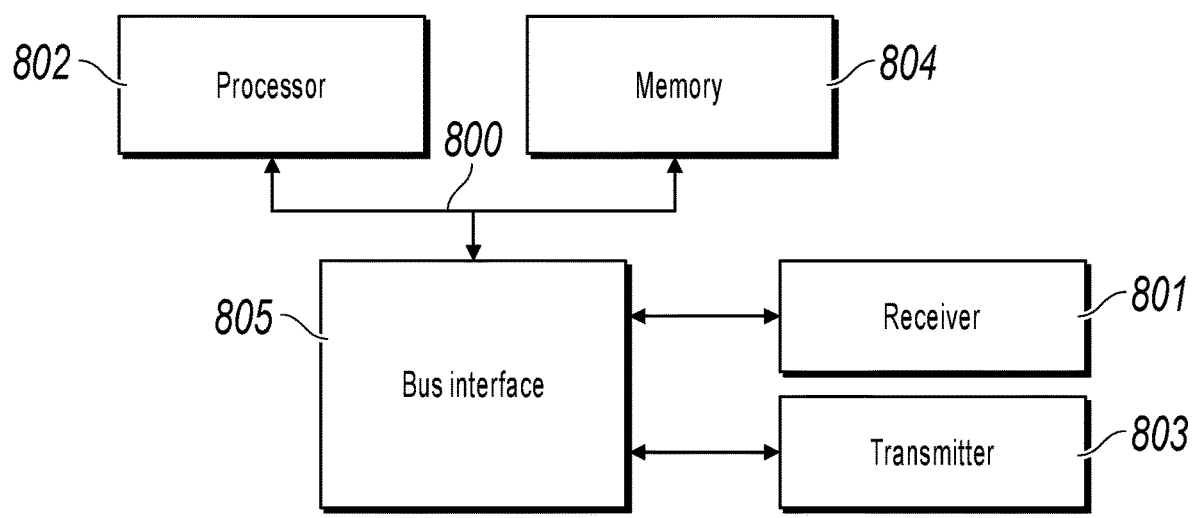
FIG. 8 is a second schematic structural diagram illustrating a user terminal, according to some embodiments of the present specification.

According to a seventh aspect, based on a same inventive concept as the cross-chain authentication methods in the above-mentioned embodiments, some embodiments of the present specification further provide a user terminal. As shown in FIG. 8, the user terminal includes a memory 804, a processor 802, and a computer program that is stored in the memory 804 and that can run on the processor 802. When executing the program, the processor 802 implements steps of any of the above-mentioned cross-chain authentication methods.

In FIG. 8, for a bus architecture (indicated by using a bus 800), the bus 800 can include any quantity of interconnected buses and bridges, and the bus 800 interconnects various circuits including one or more processors represented by the processor 802 and one or more memories represented by the memory 804. The bus 800 can further link various other circuits such as a peripheral device, a voltage regulator, and a power management circuit, which are well known in the art and therefore are not further described in the present specification. A bus interface 805 provides an interface between the bus 800 and a receiver 801, and an interface between the bus 800 and a transmitter 803. The receiver 801 and the transmitter 803 can be a same component, that is, a transceiver, which provides a unit configured to communicate with various other apparatuses on a transmission medium. The processor 802 is responsible for management of the bus 800 and general processing, and the memory 804 can be configured to store data used when the processor 802 performs an operation.

According to an eighth aspect, based on a same inventive concept as the cross-chain authentication methods in the above-mentioned embodiments, some embodiments of the present specification further provide a computer-readable storage medium, where the computer-readable storage medium stores a computer program, and the program can be executed by a processor to implement steps of any of the above-mentioned cross-chain authentication methods.

The present specification is described with reference to the flowcharts and/or block diagrams of the method, the device (system), and the computer program product based on some embodiments of the present specification. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of any other programmable data processing device to generate a machine, so that the instructions executed by a computer or a processor of any other programmable data processing device generate a device for implementing a specific function in one or more processes in the flowcharts and/or in one or more blocks in the block diagrams.

These computer program instructions can be stored in a computer readable memory that can instruct the computer or any other programmable data processing device to work in a specific mode, so that the instructions stored in the computer readable memory generate an artifact that includes an instruction device. The instruction device implements a specific function in one or more processes in the flowcharts and/or in one or more blocks in the block diagrams.

These computer program instructions can be loaded onto the computer or another programmable data processing device, so a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present specification have been described, a person skilled in the art can make changes and modifications to these embodiments once the person understands the basic inventive concept. Therefore, the following claims are intended to be construed as to cover the preferred embodiments and all changes and modifications falling within the scope of the present specification.

Obviously, a person skilled in the art can make various modifications and variations to the present specification without departing from the spirit and scope of the present specification. The present specification is intended to cover these modifications and variations provided that they fall within the scope of protection defined by the following claims and their equivalent technologies.

What is claimed is:

1. A cross-chain authentication method performed by an authentication server, comprising:
    obtaining an identity confirmation request and a first public key, wherein the identity confirmation request is generated by a second server based on a cross-chain query request received by the authentication server, the cross-chain query request is generated based on a cross-chain query operation sent by a user terminal and received by a first server, and the first public key is stored in the first server;
    obtaining an identity verification request and a corresponding identity verification identifier for identity verification of a user associated with the user terminal;
    sending the identity verification request and the first public key to the user terminal;
    obtaining digitally signed data, a second public key, and identity verification data, wherein the identity verification data is collected by the user terminal in response to the identity verification request, the second public key is generated by the user terminal using a key generator, and the digitally signed data is digitally signed by using a private key corresponding to the second public key;
    verifying an identity of the user based on the identity verification data;
    verifying that the first public key and the second public key correspond to the user; and
    recording authentication data comprising the digitally signed data and the identity verification identifier to a blockchain.

2. The method according to claim 1, wherein the authentication server stores personal information of the user, the personal information comprises an identifier of the user and biometric information of the user.

3. The method according to claim 2, wherein verifying the identity of the user comprises:
    identifying, based on the identity verification data, the personal information, and
    verifying the identity of the user by matching the identity verification data with the personal information.

4. The method according to claim 1, further comprising:
    obtaining public key request data based on the identity verification request, wherein the public key request data comprises the second public key; and
    sending the public key request data to the second server.

5. The method according to claim 4, wherein the authentication data further comprises the second public key, the identity verification data, and a hash value of an identifier of the user and a timestamp of the identifier of the user.

6. The method according to claim 5, wherein the public key request data further comprises the hash value of the identifier of the user and a hash value corresponding to a block of the blockchain that the authentication data is recorded on.

7. The method according to claim 1, wherein the verifying that the first public key and the second public key correspond to the user specifically comprises:
    obtaining a first hash value based on hashing a first identifier of a first user corresponding to the first public key;
    obtaining a second hash value based on hashing a second identifier of a second user corresponding to the second public key; and
    determining that the first hash value is same as the second hash value.

8. A non-transitory, computer-readable medium storing one or more instructions executable by a computer system to perform operations comprising:
    obtaining an identity confirmation request and a first public key, wherein the identity confirmation request is generated by a second server based on a cross-chain query request received by an authentication server, the cross-chain query request is generated based on a cross-chain query operation sent by a user terminal and received by a first server, and the first public key is stored in the first server;
    obtaining an identity verification request and a corresponding identity verification identifier for identity verification of a user associated with the user terminal;
    sending the identity verification request and the first public key to the user terminal;
    obtaining digitally signed data, a second public key, and identity verification data, wherein the identity verification data is collected by the user terminal in response to the identity verification request, the second public key is generated by the user terminal using a key generator, and the digitally signed data is digitally signed by using a private key corresponding to the second public key;
    verifying an identity of the user based on the identity verification data;
    verifying that the first public key and the second public key correspond to the user; and
    recording authentication data comprising the digitally signed data and the identity verification identifier to a blockchain.

9. The non-transitory, computer-readable medium according to claim 8, wherein the authentication server stores personal information of the user, the personal information comprises an identifier of the user and biometric information of the user.

10. The non-transitory, computer-readable medium according to claim 9, wherein verifying the identity of the user comprises:
identifying, based on the identity verification data, the personal information, and
verifying the identity of the user by matching the identity verification data with the personal information.

11. The non-transitory, computer-readable medium according to claim 8, the operations further comprising:
obtaining public key request data based on the identity verification request, wherein the public key request data comprises the second public key; and
sending the public key request data to the second server.

12. The non-transitory, computer-readable medium according to claim 11, wherein the authentication data further comprises the second public key, the identity verification data, and a hash value of an identifier of the user and a timestamp of the identifier of the user.

13. The non-transitory, computer-readable medium according to claim 12, wherein the public key request data further comprises the hash value of the identifier of the user and a hash value corresponding to a block of the blockchain that the authentication data is recorded on.

14. The non-transitory, computer-readable medium according to claim 8, wherein the verifying that the first public key and the second public key correspond to the user specifically comprises:
obtaining a first hash value based on hashing a first identifier of a first user corresponding to the first public key;
obtaining a second hash value based on hashing a second identifier of a second user corresponding to the second public key; and
determining that the first hash value is same as the second hash value.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:
obtaining an identity confirmation request and a first public key, wherein the identity confirmation request is generated by a second server based on a cross-chain query request received by an authentication server, the cross-chain query request is generated based on a cross-chain query operation sent by a user terminal and received by a first server, and the first public key is stored in the first server;
obtaining an identity verification request and a corresponding identity verification identifier for identity verification of a user associated with the user terminal;
sending the identity verification request and the first public key to the user terminal;
obtaining digitally signed data, a second public key, and identity verification data, wherein the identity verification data is collected by the user terminal in response to the identity verification request, the second public key is generated by the user terminal using a key generator, and the digitally signed data is digitally signed by using a private key corresponding to the second public key;
verifying an identity of the user based on the identity verification data;
verifying that the first public key and the second public key correspond to the user; and
recording authentication data comprising the digitally signed data and the identity verification identifier to a blockchain.

16. The computer-implemented system according to claim 15, wherein the authentication server stores personal information of the user, the personal information comprises an identifier of the user and biometric information of the user.

17. The computer-implemented system according to claim 16, wherein verifying the identity of the user comprises:
identifying, based on the identity verification data, the personal information, and
verifying the identity of the user by matching the identity verification data with the personal information.

18. The computer-implemented system according to claim 15, the operations further comprising:
obtaining public key request data based on the identity verification request, wherein the public key request data comprises the second public key; and
sending the public key request data to the second server.

19. The computer-implemented system according to claim 18, wherein the authentication data further comprises the second public key, the identity verification data, and a hash value of an identifier of the user and a timestamp of the identifier of the user.

20. The computer-implemented system according to claim 19, wherein the public key request data further comprises the hash value of the identifier of the user and a hash value corresponding to a block of the blockchain that the authentication data is recorded on.

21. The computer-implemented system according to claim 15, wherein the verifying that the first public key and the second public key correspond to the user specifically comprises:
obtaining a first hash value based on hashing a first identifier of a first user corresponding to the first public key;
obtaining a second hash value based on hashing a second identifier of a second user corresponding to the second public key; and
determining that the first hash value is same as the second hash value.

* * * * *